Patented May 16, 1933

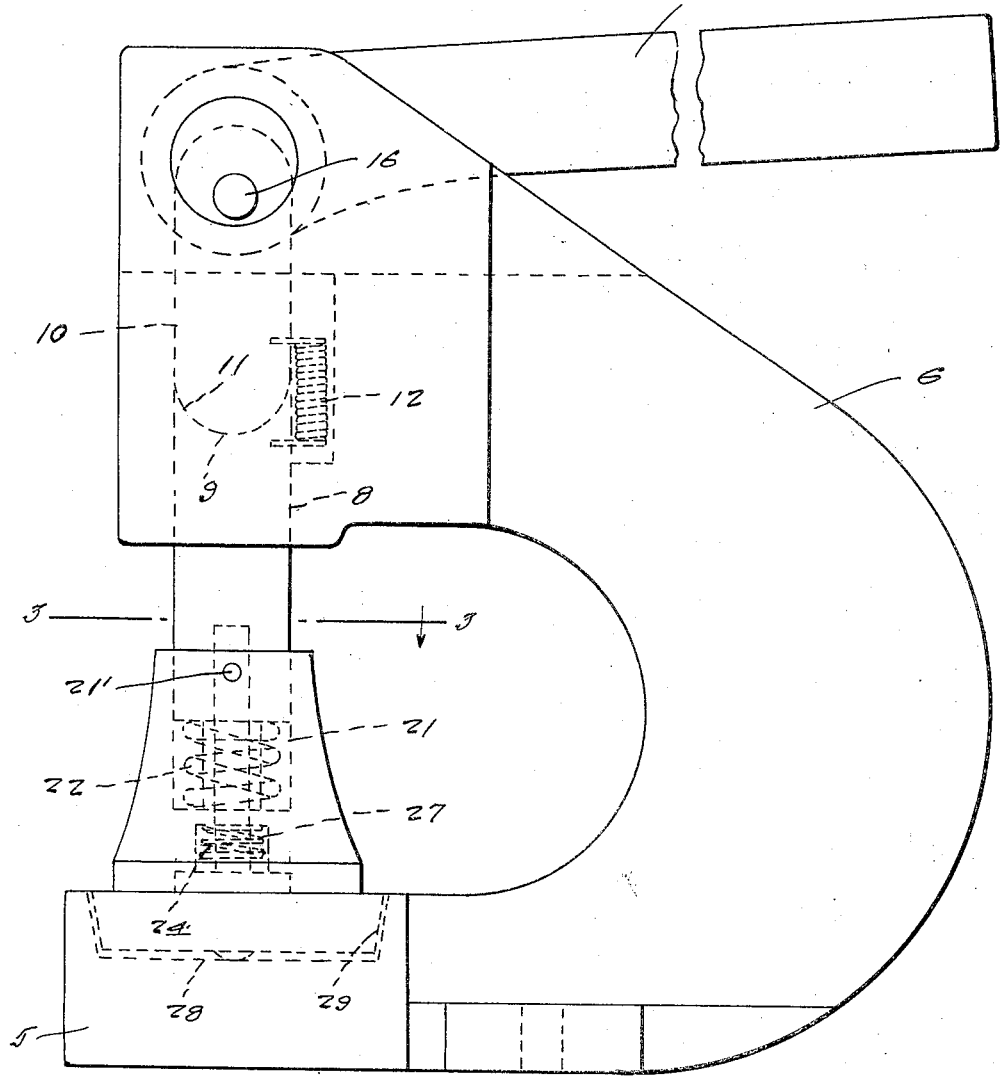

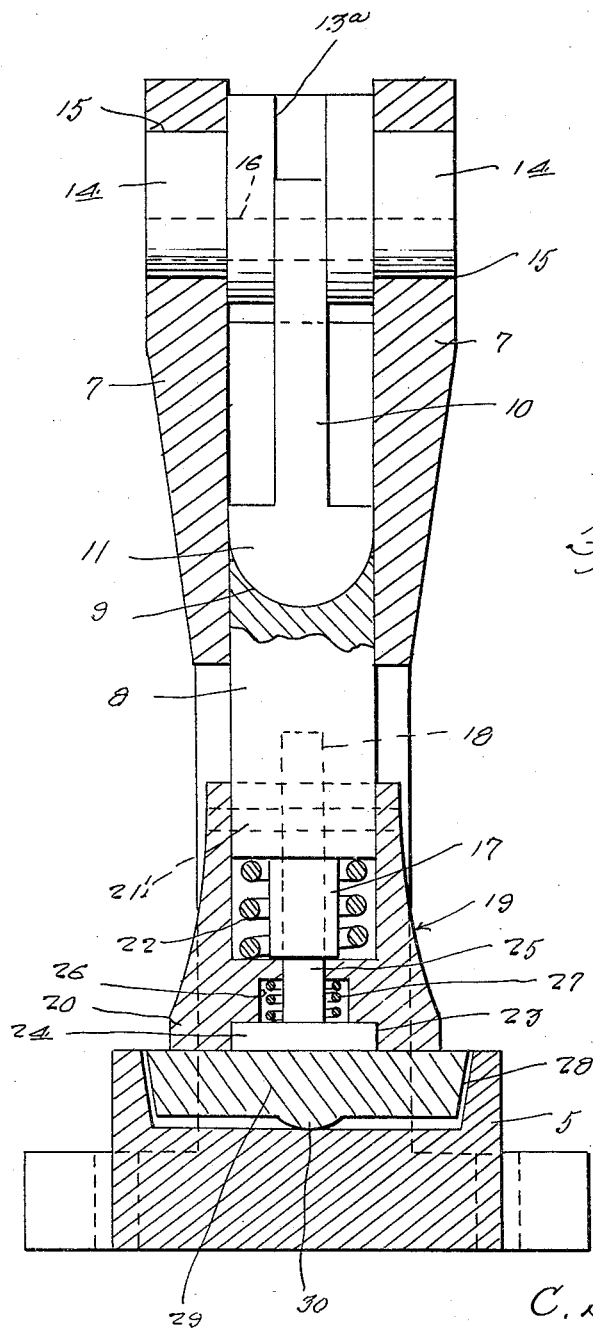

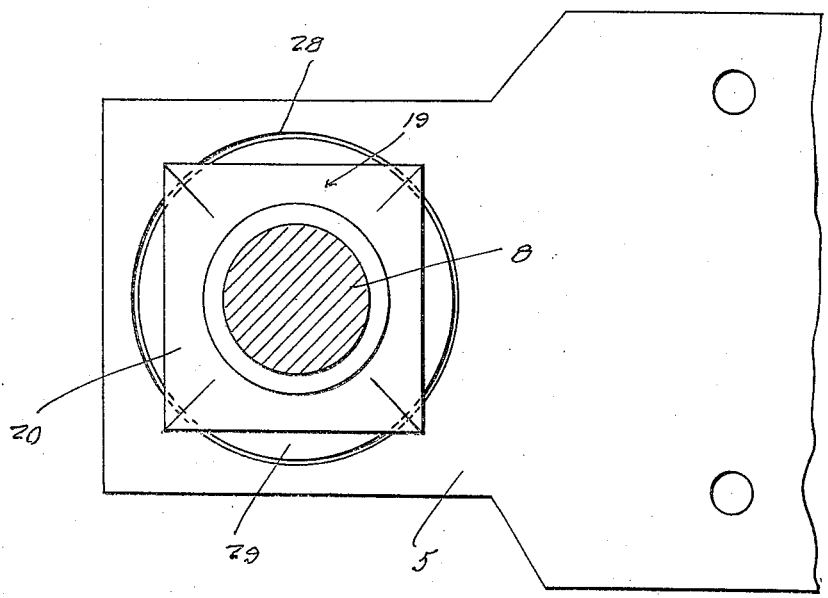
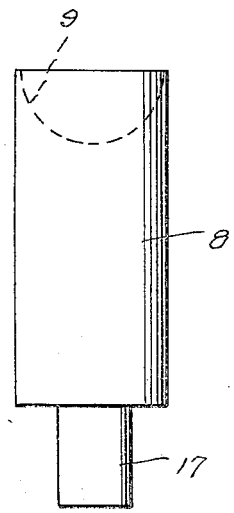
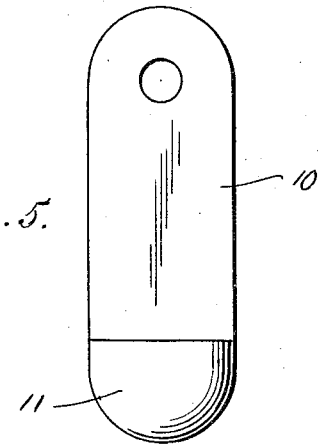

1,908,871

UNITED STATES PATENT OFFICE

CLARENCE SIMPSON, OF WALLA WALLA, WASHINGTON

REPAIR TOOL FOR RUBBER ARTICLES

Application filed November 18, 1931. Serial No. 575,888.

This invention relates to a tool or machine especially adapted for repairing articles of rubber, and the primary object of the invention is to provide for the repairing of such articles without heat or cement.

A still further object of the invention is to provide a tool for the purpose above mentioned, whereby with the use thereof, only raw rubber and pressure is required in the repairing operation.

Other objects and advantages of the invention will become apparent from a study of the following description, taken in connection with the accompanying drawings wherein:

Figure 1 is a side elevational view of the device.

Figure 2 is a longitudinal sectional elevational view therethrough.

Figure 3 is a transverse sectional view taken substantially on the line 3—3 of Figure 1.

Figure 4 is a side elevational view of a presser bar.

Figure 5 is a side elevational view of an eccentric bar.

Figure 6 is a bottom plan view of a removable base plate.

With reference more in detail to the drawings, it will be seen that my improved repair tool comprises a relatively flat base 5 from one edge of which extends a curved arm 6 which at its upper free end terminates in substantial vertical alinement with the base 5, and at said end, the arm 6 is bifurcated to provide a pair of parallel relatively spaced arm portions or extensions 7.

Vertically slidable between the portions 7 of the arm is a substantially cylindrical presser bar 8 that is provided at its upper end with a socket 9.

An eccentric rod 10 at the lower end thereof is provided with a ball like or semi-spherical head 11 that is engaged with the socket 9 providing a universal connection between the bar 10 and presser bar 8. The head 11 is yieldably urged into the socket 9 through the medium of a laterally disposed vertical coil spring 12 that has one end connected with the bar 10, and a relatively opposite end connected with the presser bar 8 as clearly suggested in Figure 1.

For reciprocating the bar 8 there is provided a handle 13 that has a bifurcated end pivotally mounted between arm extensions 7 through the medium of relatively large pintles 14 formed at said end of the handle on relatively opposite sides thereof and journalled in openings or bearings 15 provided therefor in the arm extensions 7. (See Figure 2).

At said pivoted or rockably mounted end, the handle 13 is notched or bifurcated as at 13a and receives in the notch or furcation the upper end of the eccentric bar 10, which end is eccentrically connected with the pivoted end of the handle 13 through the medium of an eccentric pin 16 extending through said upper end of the bar 10, and through the adjacent portion of the handle 13 including the pintles 14 as also clearly suggested in Figure 2.

Obviously, by rocking handle 13, reciprocatory movement will be imparted to the eccentric bar 10, and the presser bar 8.

The presser bar 8 at its lower free end is provided with an integral pin 17, and said presser bar 8 is also provided with an axial socket or bore 18 that extends inwardly thereof from the free or lowermost end of the pin 17.

Fixed on the lower end of the presser bar 8 is a presser foot 19 preferably formed of bronze metal having a lower non-circular working or base portion 20, and an upper substantially cylindrical portion provided with a socket 21 receiving the lower end of the presser bar 8.

A pin 21' extends transversely through the lower end of the presser bar 8 and the upper end of the foot 19 for securing the foot in position on said presser bar. Arranged within the socket 21 and disposed about the pin 17 is a relatively strong coil spring 22 which serves as a cushion device.

In the base or working portion 20 thereof, presser foot 19 is provided with a circular recess 23 accommodating a plunger 24 that is provided with a stem 25 slidable through the bore 18, and at its inner end the stem 25 is longitudinally slotted to accommodate a portion of the pin 21'.

Arranged above the circular recess 23 and communicating therewith is a relatively deeper recess 26 within which and disposed about the stem 25 is a relatively weaker or smaller coil spring 27 that impinges against the plunger 24 normally urging the same outwardly of the recess 23.

In substantial alinement with the foot 19, the base 5 at the top thereof is provided with a circular recess 28 within which is removably arranged a relatively flat base plate 29 which on its bottom face is provided with a centrally located protuberance 30. The purpose of the protuberance 30 is to permit required rocking movement of the base plate 29 to compensate for varying thicknesses of the rubber from which the article under course of repairing is made.

In use, the rubber article to be repaired is placed on the base 29 together with the raw rubber to be used in repairing the fractured article. When so placing the article and the raw rubber positioned thereon, on the base plate 29 it is understood of course that the foot 19 is raised above and spaced from the base plate.

Plunger 24 under action of spring 27 is forced downwardly on to the raw rubber, serving to spread both the raw rubber and the article to be repaired outwardly in all directions from the center until enough pressure (about four hundred pounds) has been attained. The handle 13 is then rocked to cause a downward movement of the presser bar 8 and resultant movement of the foot 19 into pressing contact with the raw rubber which thus serves to clamp all edges of the raw rubber down firmly on to the article being repaired. When the handle has been forced upwardly sufficiently to cause pressing engagement of the foot 19 with the raw rubber a pressure of from one thousand to twelve hundred pounds may be obtained, and under this pressure, the raw rubber is forced into all the openings or fractures of the article making a permanent seal for the fractures or openings after this pressure has been exerted for a material period of time.

From the foregoing then it will be seen that by the use of this device or tool, repairing of fractured rubber articles may be accomplished without the use of heat or cement, the invention comprehending means whereby such repairing of the rubber article may be obtained solely by pressing raw rubber into the material of the article under sufficient pressure as to force the raw rubber into the fractures or openings of the article for sealing them.

Even though I have herein shown and described the preferred embodiment of the invention it is to be understood that the same is susceptible of changes, modifications and improvements coming within the scope of the appended claims.

Having thus described my invention, what I claim as new is:

1. In a tool of the class described, a base, a bracket arm extending upwardly from the base and provided at its upper end with a pair of spaced parallel apertured extensions disposed above the base, a handle lever having an end pivoted between said extensions, a presser bar, means eccentrically connecting the presser bar with the pivoted end of said handle lever, a presser foot carried by the lower end of the presser bar, and a spring tensioned plunger having a stem extending through an opening in the foot and slidably engaged with the presser bar, a head on the end of said stem, and said presser foot in the bottom thereof provided with a recess receiving said plunger head.

2. In a tool of the class described, a base provided in the top side thereof with a recess, a base plate arranged in the recess and provided on its under side with a centrally located protuberance whereby provision is made for rockably retaining the base plate within said recess, an arm rising from said base and having an end thereof disposed above the base, a lever pivotally connected with said end of the arm, a rod having an upper end eccentrically connected with the pivoted end of said lever, said rod having its free end provided with a head, a pressure bar having a socket in its upper end receiving said head, spring means connecting the adjacent end of said rod and bar, a presser foot slidably carried by said presser bar, cushioning means for said presser foot, and a spring tensioned plunger having a stem extending through the presser foot and slidably engaged with the presser bar, and also having a head at one end of the stem, and said presser foot provided with a recess receiving said head.

3. In a tool of the class described, a base, an arm rising from said base and having a bifurcated upper end disposed above the base, a handle lever pivoted at one end to the bifurcated end of said arm, a sectional rod having an end eccentrically connected to the pivoted end of said handle lever, ball and socket means connecting the sections of said rod, a presser foot slidably carried on the lower end of said rod and provided with a socket for receiving said end of the rod, and a cushioning spring for said foot arranged in said socket and having an end bearing against the inner end of said rod.

4. In a tool of the class described, a base, an arm rising from said base, a handle lever pivotally connected at one end to the upper end of said arm, a two-part rod having the upper end of one part eccentrically connected to the pivoted end of said handle lever, ball and socket means connecting the joined ends of the rod parts, a spring bridging the joint between said rod parts and connected at its ends with the joined ends of said rod parts, and a presser foot on the lower end of the other of said rod parts.

5. In a tool of the class described, a base, an arm rising from said base, a handle lever pivotally connected at one end to the upper end of said arm, a two-part rod having the upper end of one part eccentrically connected to the pivoted end of said handle lever, ball and socket means connecting the joined ends of the rod parts, a spring bridging the joint between said rod parts and connected at its ends with the joined ends of said rod parts, and a presser foot on the lower end of the other of said rod parts, cushioning means for said presser foot, and a spring tensioned plunger slidably carried by the presser foot.

In testimony whereof I affix my signature.

CLARENCE SIMPSON.